United States Patent [19]

Capponi et al.

[11] 4,264,323

[45] Apr. 28, 1981

[54] AQUEOUS CONCENTRATES OF COLD-DYEING FIBRE REACTIVE DYES

[75] Inventors: Miro Capponi, Muttenz; Urs Ruf, Oberwil; Franz Somm, Riehen, all of Switzerland

[73] Assignee: Sandoz Ltd., Basel, Switzerland

[21] Appl. No.: 74,916

[22] Filed: Sep. 12, 1979

Related U.S. Application Data

[63] Continuation-in-part of Ser. No. 908,618, May 23, 1978, abandoned.

[30] Foreign Application Priority Data

May 24, 1977 [CH] Switzerland .......................... 6381/77

[51] Int. Cl.³ ...................... D06P 67/00; C09B 62/00
[52] U.S. Cl. .......................................... 8/527; 8/549; 8/912
[58] Field of Search ................... 8/1 A, 1 D, 1 E, 25, 8/89 R, 549, 527, 912

[56] References Cited

U.S. PATENT DOCUMENTS 4,078,885   3/1978   Opitz et al. ............................... 8/1 A

FOREIGN PATENT DOCUMENTS 2520527 11/1975 Fed. Rep. of Germany .
1131043 10/1968 United Kingdom .
1400580  7/1975 United Kingdom .

OTHER PUBLICATIONS

Venkataraman, K., "The Chemistry of Synthetic Dyes", vol. VI, (Academic Press, 1972), pp. 121–122.
Colour Index, Revised Third Edition, vol. 6, (Soc. Dyers and Colourists, 1975), p. 6265.

*Primary Examiner*—A. Lionel Clingman
*Attorney, Agent, or Firm*—Gerald D. Sharkin; Richard E. Vila; Thomas C. Doyle

[57] ABSTRACT

Disclosed are stable, concentrated, aqueous dyestuff preparations comprising water, an anionic dispersing agent and at least one cold-dyeing water soluble fibre reactive dye, said dye having an average particle diameter of less that 20 $\mu$, other optional constituents being one or more disperse dyes, acid, such as acetic acid, to adjust the pH of the preparation to a preferred value of 4 to 6, and organic solvents. The preparations are useful for the convenient production of dyebaths for dyeing substrates containing a fibre reactive dyeable component.

24 Claims, No Drawings

AQUEOUS CONCENTRATES OF COLD-DYEING FIBRE REACTIVE DYES

The present application is a continuation-in-part of our co-pending application Ser. No. 908,618 filed on May 23, 1978 and now abandoned.

The present invention relates to dyestuff preparations and more particularly to stable, concentrated, aqueous preparations of cold-dyeing fibre reactive dyes.

Thus, the present invention provides a stable, concentrated, aqueous dyestuff preparation comprising water, an anionic dispersing agent and at least one cold-dyeing water soluble fibre reactive dye, said dye having an average particle diameter of less than 20μ.

By "concentrated aqueous dyestuff preparation", as used herein, is meant aqueous dyestuff preparations which contain from 10 to 50%, preferably from 20 to 40%, by weight of dyestuff.

Since the preparations according to the present invention contain fibre-reactive dyes, the dispersing agent, or indeed any other additive contained therein, should not contain groups, such as hydroxyl or amino groups, with which the dyes would react.

The anionic dispersing agents used in the preparations of the present invention are preferably the known, commercial, alkylated naphthalene sulphonic acids, e.g. containing 1 to 3 $C_{1-4}$alkyl groups and 1 or 2 sulphonic acid groups, and the condensation products of optionally alkylated naphthalene sulphonic acids with formaldehyde, e.g. containing up to 10, preferably 2-5, naphthalene units. Especially preferred dispersing agents for use in the preparations of the invention are those of formula I,

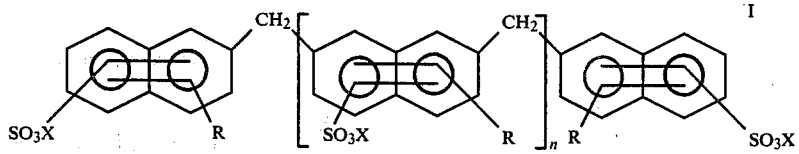

wherein
the R's, independently, are hydrogen or $C_{1-10}$alkyl,
the X's are Na or K, and
n is 0 to 4, and mixtures thereof.

In the compounds of formula I, any alkyl radical as R is preferably of 1 to 4 carbon atoms and is more preferably methyl. Most preferably all the R's are hydrogen. n is preferably 0 to 2. When any R is other than hydrogen it is preferably not in the same ring as the —$SO_3X$ group.

The above compounds of formula I are either known or may be produced in analogous manner to the known compounds. They are generally obtained and used as mixtures wherein the components differ one from another in the value of n.

The amount of dispersing agent present in the preparations of the present invention can vary within wide limits, e.g. from 5 to 100 parts by weight per 100 parts by weight of dyestuff. Preferably, however, the dispersing agent is present in an amount of from 5 to 50, more preferably 20-30, parts by weight per 100 parts by weight dyestuff.

The cold-dyeing water soluble fibre reactive dyes contained in the preparations of the invention are a known class of dyes which contain, as the reactive grouping, a difluorochloropyrimidinyl group, with those containing a 5-chloro-2,4-difluoropyrimidinyl group, such as the commercially available Drimarene ® R and K dyes, being especially preferred. The reactive dyes are preferably employed in low salt content form and in the form of their alkali-metal, e.g. sodium or ammonium salts. By "water soluble" is meant a dye having a solubility in water of at least 5 g/l at 25° C.

The preferred average particle diameter of the reactive dye is less than 10μ, the normal lowest limit of particle size being about 1-2μ. Particles of such diameter may be obtained by grinding the reactive dyestuff in conventional manner. Suitably, however, a mixture of the reactive dye, anionic dispersing agent and water is subjected to mechanical comminution, preferably in a sand mill, although kneading machines and ball mills may also be used. Generally less water than in the final preparation would be employed in such mixtures, appropriate dilution being carried out after the grinding.

The preparations according to the invention may contain additives other than the reactive dye, anionic dispersing agent and water. For example, organic solvents or other additives may be contained therein, depending, for example, on the use to which the preparation is ultimately to be put. Such further additives should, however, be chosen so as not unduly to affect the storage or stability qualities of the preparation. Indeed, the pH of the preparations according to the invention is preferably adjusted to lie in the range of 4 to 6, preferably about 5, e.g. by addition of an acid such as acetic acid. Further, in a particularly preferred embodiment of the invention, the preparations contain a mixture of disperse and fibre reactive dye, the disperse dye, like the fibre-reactive dye, having a particle diameter of less than 20μ and preferably less than 10μ. Preferably the disperse dye is ground together with fibre reactive dye, suitably by being included in the dye/anionic dispersing agent/water mixture, as described above. The particle sizes of the disperse and fibre reactive dyes are preferably the same and in the preferred preparations according to the invention both types of dyes have been ground to a particle size of less than 5μ.

The nature of the disperse dye is not critical and may, for example, be any of the disperse dyes identified as such in the Colour Index, whether of the azo, anthraquinone or other series. It may be employed, as indeed can also the reactive dye be employed, in press-cake form.

The weight ratio of disperse dye to reactive dye in the preparations of the invention containing both types is preferably in the range of from 1:3 to 3:1, more preferably from 1:2 to 2:1.

In a sense, in the preparations of the invention containing both disperse and fibre reactive dyes, the disperse dye replaces part of the fibre reactive dye content. That is to say the 10 to 50% by weight of dyestuff contained in the preparations means 10 to 50% by weight of fibre reactive dye and disperse dye. Also, the above given weight ratio of dispersing agent to dyestuff is to the total weight of both fibre-reactive and disperse dyestuffs, where both types are present.

The preparations provided by the present invention, whether comprising reactive dyestuff alone or reactive dyestuff along with disperse dyestuff, are essentially dispersions, although, of course, some dyestuff is dissolved, and may be employed in conventional manner to form dyebaths, printing pastes and the like for the dyeing or printing of appropriate substrates, e.g. cellulosic substrates when containing solely reactive dyestuff and cellulosic, e.g. cotton/polyester blends when containing both reactive and disperse dyestuff. They do not need special additives such as buffering agents.

Because of their liquid nature, the preparations of the present invention obviate the problems of dusting etc. which occur with powdered dyestuff preparations and also facilitate metering and distribution of the desired amount of colour into dyebaths etc. The preparations are storable for relatively long periods and after four months storage at room temperature they give dyeings or prints of unchanged colour.

The following examples, in which all parts and percentages are by weight, unless otherwise stated, and all temperatures are in degrees centigrade, illustrate the invention.

EXAMPLE 1

30 Parts of the golden-yellow dyestuff C.I. Reactive Yellow 85, in pigment form with reduced coupage, 10 parts of a commercial dispersing agent, being a mixture of compounds of formula I in which R is H, X is Na and n is from 0 to 2, and 40 parts of water are ground in a sand mill for 2 hours with cooling. After separating the sand from the ground material, the aqueous dispersion is adjusted to 30% dyestuff content. A preparation having very finely dispersed dyestuff is obtained. The pH value of the preparation is set at 5.0 with acetic acid.

A cotton fabric is pad-dyed with an aqueous bath containing
  50 g/l of the above dyestuff dispersion
  100 g/l of urea
  10 g/l of common salt
  9 g/l of sodium bicarbonate
and it is squeezed out to a liquor absorption of 70% of the fibre weight. The fabric is subsequently dried for 60 seconds at 120° C. and steamed for 30 seconds at 102° C. After rinsing and soaping, an even, brilliant golden-yellow dyeing is obtained with very good fastness properties.

EXAMPLE 2

20 Parts of the dyestuff C.I. Reactive Red 147 in pigment form (without dilution), 20 parts of the above mentioned commercial disperse agent and 50 parts of water are ground for 2 hours in a sand mill. After separating the sand, the dispersion obtained is adjusted to 20% dyestuff content by adding water.

A cotton fabric is pad-dyed with an aqueous bath consisting of
  30 g/l of the above dispersion
  100 g/l of urea
  8 g/l of sodium bicarbonate
  10 g/l of common salt.
The fabric is squeezed out to a weight increase of 70%, dried at 120° C. and given Thermosol treatment for 60 seconds at 150° C. After rinsing and saponifying, an even, red dyeing is obtained with good fastness to washing and to light.

EXAMPLE 3

A printing paste of the following composition is prepared:
  30 parts of the 20% dispersion obtained in Example 2
  100 parts of urea
  322 parts of water
  500 parts of emulsion thickener
  40 parts of "Revatol S" (1:3)
  8 parts of sodium bicarbonate
and a cotton fabric is then printed with this on a Rouleaux printing machine. The fabric is dried at 100° C. and subsequently subjected to dry heat treatment at 150° C. for 90 seconds. The fabric is then rinsed with cold and hot water, soaped whilst boiling and subsequently rinsed cold. An even red print is obtained with good fastness.

EXAMPLE 4

12 Parts of C.I. Disperse Orange 96 press cakes, 7 parts of C.I. Reactive Orange 62 (without dilution), 19 parts of the above mentioned commercial dispersing agent and 60 parts of water are ground in a sand mill for 3 hours to an average particle size of below 5μ. After separating the sand, the dispersion obtained is adjusted to 19% dyestuff content and the pH value is brought to 5.5.

A polyester/cotton mixed fabric 67/33 is pad-dyed with an aqueous bath consisting of
  35 g/l of the above dyestuff dispersion
  60 g/l of urea
  10 g/l of common salt
  1 g/l of highly viscous sodium alginate
  10 g/l of a commercial polyacrylic acid amide thickener
  8 g/l of sodium bicarbonate
and the fabric is squeezed out to a weight increase of 70%. It is subsequently dried at 120° C. and given a Thermosol treatment for 60 seconds at 220° C. After rinsing and soaping, an even orange dyeing is obtained with good fastness.

What is claimed is:

1. A stable, concentrated, aqueous dyestuff preparation comprising water, an anionic dispersing agent and at least one cold-dyeing water soluble fibre reactive dye, said dye having an average particle diameter of less than 20μ, and containing a difluorochloropyrimidinyl group, and said dispersing agent being free from hydroxy and amino groups and other groups reactive with said dye.

2. A preparation according to claim 1, containing from 20 to 40% by weight of dyestuff.

3. A preparation according to claim 1, wherein the dispersing agent is an alkylated naphthalene sulphonic acid or a condensation product of an optionally alkylated naphthathalene sulphonic acid with formaldehyde.

4. A preparation according to claim 3, wherein said alkylated naphthalene sulphonic acid employed as dispersing agent contains 1 to 3 $C_{1-4}$alkyl groups and 1 or 2 sulphonic acid groups.

5. A preparation according to claim 3, wherein said condensation product is a compound of formula I,

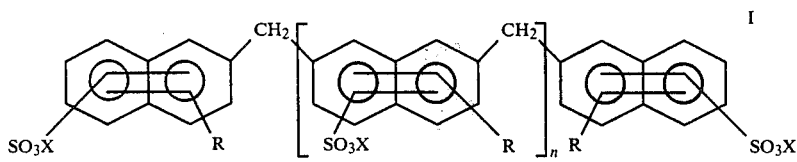

wherein
the R's, independently, are hydrogen or $C_{1-10}$alkyl,
the X's are Na or K, and
n is 0 to 4, or a mixture thereof.

6. A preparation according to claim 5, wherein, in the compound of formula I, any alkyl as R is of 1 to 4 carbon atoms.

7. A preparation according to claim 5, wherein all the R's are hydrogen.

8. A preparation according to claim 5, wherein n is 0 to 2.

9. A preparation according to claim 1, wherein the amount of dispersing agent is in the range of from 5 to 100 parts by weight per 100 parts by weight of dyestuff.

10. A preparation according to claim 9, wherein said amount is from 5 to 50 parts by weight per 100 parts by weight of dyestuff.

11. A preparation according to claim 1, wherein the average particle diameter of the reactive dye is less than 10μ.

12. A preparation according to claim 1, the pH of which is caused to lie in the range of from 4 to 6.

13. A preparation according to claim 1, containing, in additional to the fibre reactive dye, a disperse dye.

14. A preparation according to claim 13, wherein the total amount of disperse and reactive dyestuff amounts to from 20% to 40% by weight of the preparation.

15. A preparation according to claim 13, wherein the weight ratio of disperse dye to fibre reactive dye is in the range of from 1:3 to 3:1.

16. A preparation according to claim 13, said disperse dye having an average particle diameter of less than 20 μ.

17. A process for dyeing a substrate containing a fibre reactive dyeable component comprising employing a preparation according to claim 1, optionally after dilution.

18. A preparation according to claim 1 wherein the reactive dye contains a 5-chloro-2,4-difluoro-pyrimidinyl group.

19. A preparation according to claim 18 wherein the dispersing agent is an alkylated naphthalene sulphonic acid or a condensation product of an optionally alkylated naphthalene sulphonic acid with formaldehyde and is present in an amount ranging from 5 to 100 parts by weight per 100 parts of dye, said preparation having a pH in the range 4–6 and being stable for at least four months at room temperature.

20. A preparation according to claim 1 wherein the particle size of the dye is achieved by grinding.

21. A preparation according to claim 1 which is essentially a dispersion of the dye in the water.

22. A preparation according to claim 3 wherein the amount of dispersing agent is in the range 5 to 50 parts by weight per 100 parts by weight of dyestuff.

23. A preparation according to claim 22 having a pH in the range of 4 to 6.

24. A preparation according to claim 23 which contains 20 to 40% by weight of dyestuff and is essentially a dispersion of the dyestuff in the water and is stable for at least four months at room temperature.

* * * * *